April 9, 1929.   J. W. BELL ET AL   1,708,253
METHOD OF CLEANING AND PRECOOLING VEGETABLES FOR SHIPMENT
Filed April 24, 1925   3 Sheets-Sheet 1
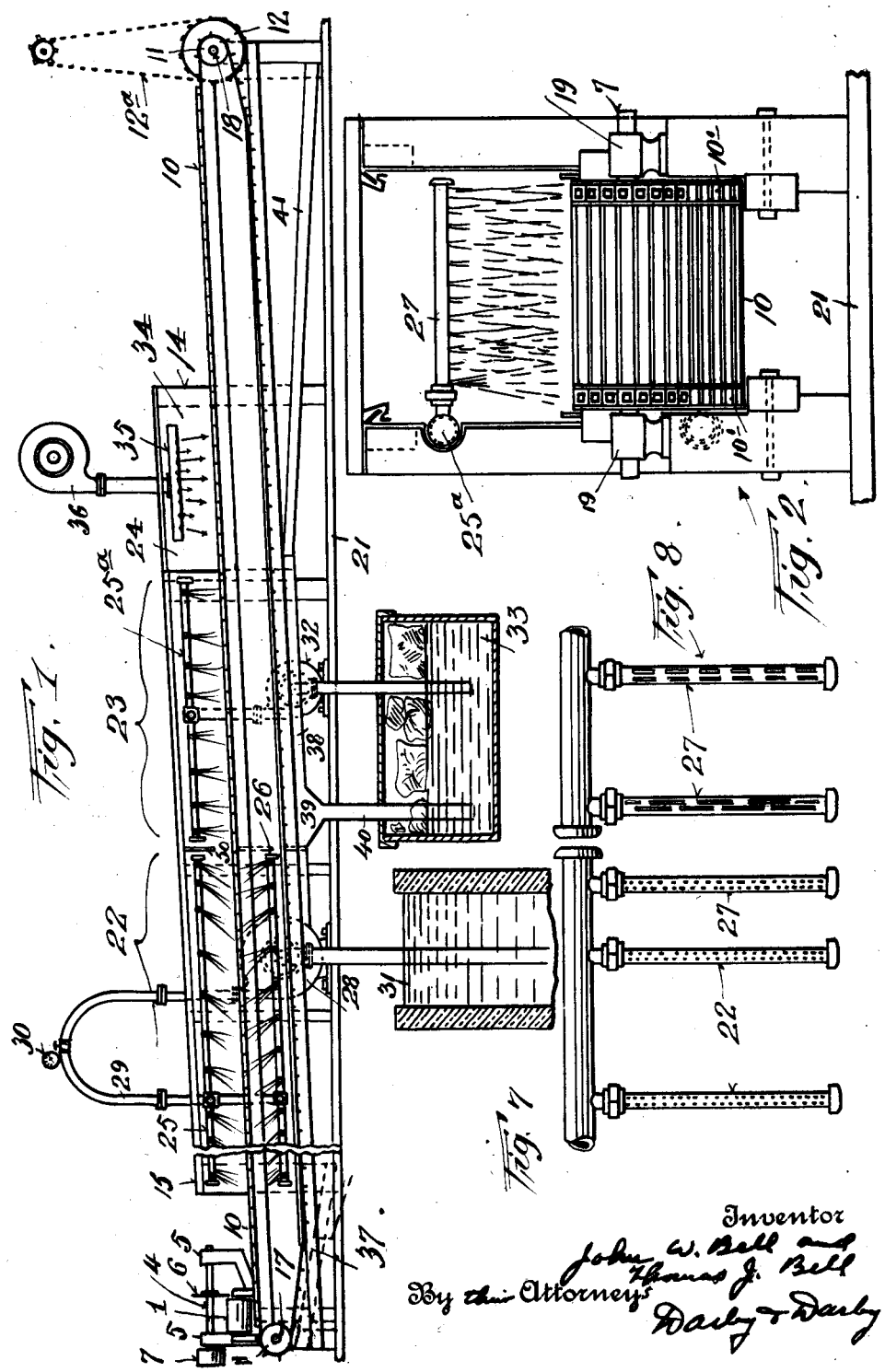

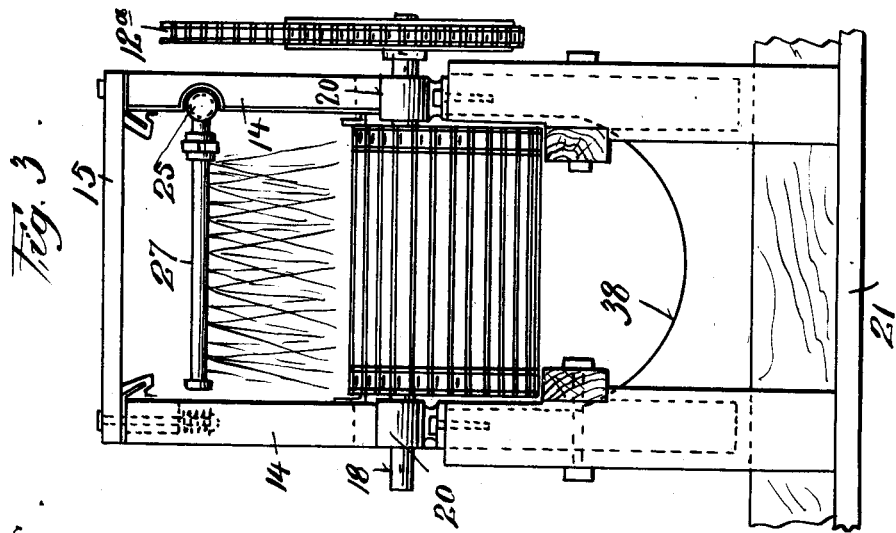
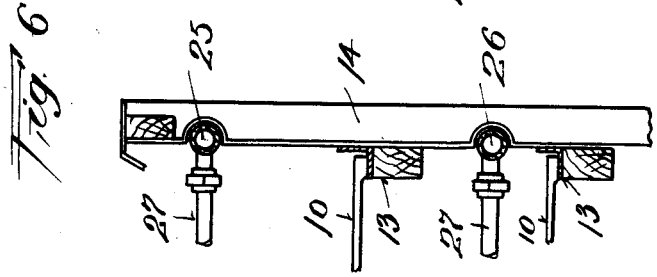
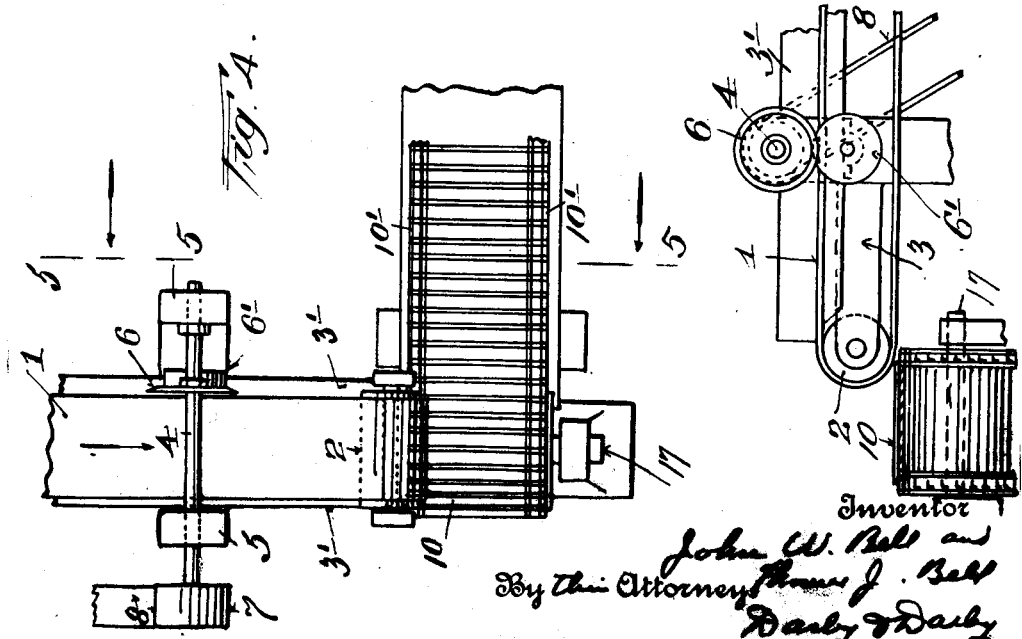

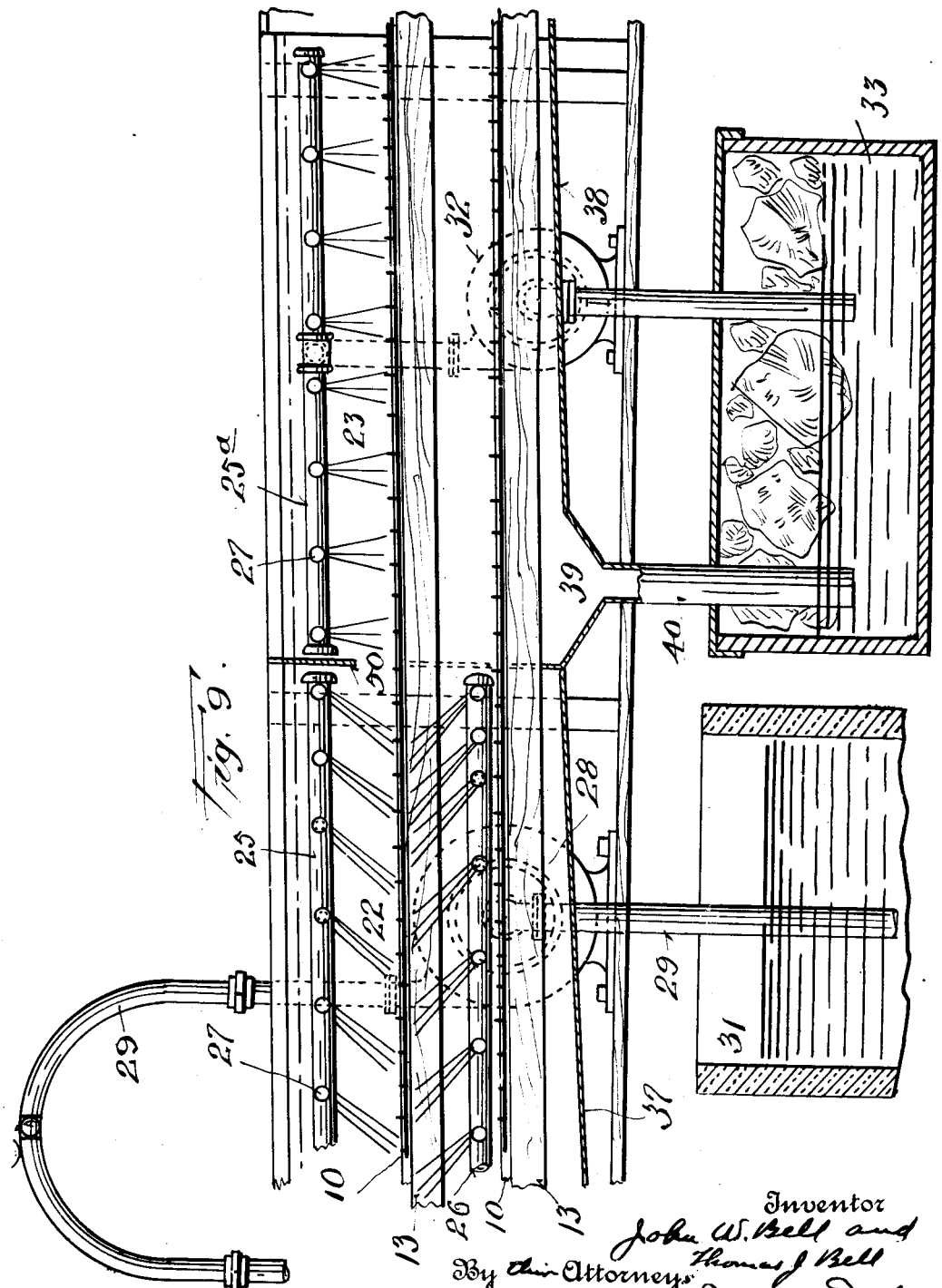

Patented Apr. 9, 1929.

1,708,253

UNITED STATES PATENT OFFICE.

JOHN W. BELL AND THOMAS J. BELL, OF LAKE MONROE, FLORIDA.

METHOD OF CLEANING AND PRECOOLING VEGETABLES FOR SHIPMENT.

Application filed April 24, 1925. Serial No. 25,575.

This invention relates to a method of preparing vegetables prior to packing the same for shipment.

The object of the invention is to provide a method and apparatus which is simple and efficient for cleaning and precooling vegetables, such as celery, peppers, and others, so as to remove therefrom fibrous roots, adhering soil or superfluous leaves or other undesirable matter, and at the same time to precool and prepare the vegetables so that they will be better preserved during shipment and be ready for use upon reaching the market.

Another object of the invention is to provide a method of the nature and character referred to, which is economical and efficient in operation and by which the vegetables named can be effectively prepared for packing and shipping.

A further object of the invention is to provide a continuous process for the removal of any excess moisture in the vegetable which might be present due to the cleaning and precooling of the same.

Further objects of the invention will appear more fully hereinafter.

The invention consists substantially in the steps set forth and is capable of being carried out by our apparatus herein described.

Referring to the accompanying drawings and to the various views and reference numerals appearing thereon:—

Fig. 1 is a view in side elevation, with the side wall removed, illustrating an arrangement of apparatus constructed in accordance with and carrying out the objects and purposes of our invention.

Fig. 2 is an end view of the apparatus at the feeding end of same, with the cutting portion not shown.

Fig. 3 is an end view of the apparatus at the discharge end of same, the drying unit being eliminated.

Fig. 4 is a broken top plan view of that portion of the apparatus employed for cutting the tops, fibrous roots or the leaves, in part or all, from the vegetables before the same are cleaned and precooled.

Fig. 5 is a view in elevation taken on the line 5—5 of Fig. 4 and looking in the direction of the arrows.

Fig. 6 is a broken detail sectional view in elevation of one of the side walls of the apparatus, showing the arrangement of the several parts with respect thereto.

Fig. 7 is a broken detail view showing the construction of one form of spray used in the apparatus.

Fig. 8 is a similar view showing alternative form of spray nozzles.

Fig. 9 is an enlarged broken sectional view of Fig. 1, showing a portion of the cleaning and precooling parts of the apparatus.

The same part is designated by the same reference numeral wherever it occurs throughout the several views.

While we have shown and now will describe our invention of a method and apparatus as particularly adapted for use in cutting, cleaning and precooling celery, we do not desire to be limited or restricted in this respect as the features of this invention may readily be utilized for the same purposes in connection with other vegetables, fruits and the like.

In packing celery for shipment, the usual practice is to bring the same in from the field, give each bunch of stalks a superficial washing by dousing the same in water and then pack a number of bunches in a crate. The crate, after being packed, is then passed through a precooling apparatus which is adapted to direct sprays of iced water on the crate to cool the celery so that it will not spoil during shipment. Quite frequently the celery is packed in crates without the above mentioned preliminary washing and the crate is then subjected to the precooling operation, as above described.

Celery packed and shipped in the manner above described quite frequently spoils during transit, due to insects, dirt and other matter left between the stalks, or because the precooling of the celery after it is packed in the crate fails to sufficiently precool the stalks.

Even if the celery packed and shipped in this manner does reach its destination in good condition, the dealer receiving the same has to thoroughly wash it before he can put it on sale. This additional labor and handling tends to increase the cost of the celery to the consumer. It also decreases the profit to the shipper, and is one of the chief causes of deterioration in flavor.

It is among the special purposes of our present invention to so prepare the celery before shipment that it will be thoroughly cleaned, precooled and have less tendency to spoil during transit, and the necessity of additional handling by the dealer receiving the same will be eliminated.

It is also among the special purposes of our invention to provide a method and apparatus for accomplishing these results in a simple, economical and practical manner.

We have developed a most efficient method of treating green vegetables for preparing them for market so as to present most attractive appearances and retain their natural flavor. The method comprises subjecting the green vegetables in a continuous path or succession to preliminary cleaning and trimming steps to remove superfluous vegetation and adhering foreign matter, then causing the precleaned vegetables to travel in a substantially straight line and while so traveling causing jets of water to be impinged tangentially against said traveling vegetables from various directions, thereafter causing said vegetables to be cooled and dried while continuing their course of travel, and finally wrapping the prepared vegetables and crating the same. When the method is applied to celery the individual bunches are subjected to the precleaning and trimming steps and then the precleaned and trimmed bunches are subjected to the washing, the cooling and the drying steps in succession as a continuous mode of operation. Celery thus treated is clean and attractive, and because of the proper treatment retains its flavor to a remarkable degree.

The method just described is capable of being performed by various instrumentalities, and we will now describe one form of apparatus which is designed to carry out our improved process.

The apparatus for carrying out our invention will be considered under four headings: (1) the trimming and preliminary cleaning or precleaning unit; (2) the washing or cleaning portion of the machine; (3) the precooling part; and (4) the drying mechanism.

That part of the apparatus coming under the first heading is best shown by Figs. 4 and 5, and comprises an endless conveyor 1 which is actuated by a suitable driving mechanism (not shown). This conveyor is an endless belt, or the like, which is appropriately supported near its delivery end by an idler 2 which, in turn, is supported in a frame 3. This frame is secured to the side walls 3', 3'. A drive shaft 4 supported in bearings 5, 5, is provided with a drive pulley 7 for operating the cutter disk 6 to remove superfluous and foreign matter and to trim the tops or root fibres of such vegetables as celery, beets, carrots and the like. The cutting is accomplished by reason of the cutting disk rotating over the surface of the idler 6' and thus trimming the vegetables as they are carried past by the conveyor 1. The trimmer may obviously be placed on either side of the conveyor, and where the trimmer is used for removing the rootlets, as in celery, it also removes foreign matter, as adhering soil. Vegetables thus trimmed are moved sidewise and delivered on to conveyor 10 of the washing and cleaning portion of the apparatus. This conveyor preferably runs at right angles to conveyor 1 to thereby expose the top ends first to the direct jets of water. Conveyor 10 is a continuous band of spaced slats carried by chains 10' over the idler 11 at one end of the apparatus and over the drive sprocket 12 at the other. The sprocket is driven by a chain 12ª from any suitable source to drive the conveyor 10. This conveyor is further supported by guide rails 13, 13, on both sides of the enclosing side walls 14, 14. These walls are provided with a cover 15 to form a casing for the washing, cooling and drying portions of the apparatus, through which the vegetables are conveyed for the purpose stated. It will be noted that the drive sprocket 12 is placed somewhat higher than sprocket 11 so that the conveyor 10 will carry the vegetables up an incline through the cleaning, precooling and drying portions of the apparatus. Sprockets 11 and 12 are supported by shafts 17 and 18 in bearings 19 and 20, as is best shown in Figs. 1 and 3.

The second portion of the apparatus, or the washing and cleaning part, is broadly designated by the numeral 22 (Figs. 1 and 9). This portion of the apparatus comprises a chamber wherein the water supplying pipes 25 and 26 extend longitudinally thereof supported by seats in the wall 14. Pipe 25 is placed above the upper portion of conveyor 10 and pipe 26 is placed below said portion. Both pipes are provided with lateral branch or spray pipes 27 extending therefrom at right angles. These pipes are provided with a number of holes, as shown in Fig. 7, or with slits, as shown by Fig. 8, through which water is forced at appropriate pressure and as is indicated by a gauge 30. Water is derived from any source of supply 31, by means of a pump 28 taking in water through pipe 29, and forcing it out through the openings in the spray pipes 27. For the most effective arrangement, we cause the jets to be directed tangentially on to the moving celery or vegetables from opposite directions.

The precooling portion of the apparatus is generally designated by the numeral 23 (Figs. 1 and 9). This part includes the continuous chamber of the washing portion from which, however, it is separated partially by a partition 50. A water supplying pipe 25ª is arranged above the conveyor 10 and its branch pipe 27 provides means for spraying ice water on to the vegetables and properly lowering their temperature. For this purpose we provide a pump 32 which conveys the ice water from a source of supply 33 to the distributing pipes.

The cooled vegetables now pass into the drying portion of the apparatus to be relieved of superfluous water prior to packing.

The cooling portion of the apparatus consists of the chamber 34 having arranged therein a distributer pipe 35 to which cool, dry air is supplied by a blower 36. In the preferred form, air is directed on to the moving vegetables from above, as shown in Fig. 1, but the position of the distributer pipe or the number thereof is capable of being varied without departing from the spirit and scope of our invention.

The lower portion of the washing and cleaning unit 22 is provided with a drain pan 37 which is inclined at an angle so that the water which is sprayed on the conveyor as it passes through this portion of the unit will be caught therein and directed to any suitable discharge opening.

The lower portion of the precooling unit chamber 23 has a similar drain pan 38 which is arranged so that the iced water discharged from pipes 25ª and 27 will be directed towards a discharge opening 39 which is arranged to return the water to the supply source 33 by means of a pipe 40.

A similar drain pan 41 is provided at the discharge end of the apparatus and is adapted to carry off any water which might drip from the vegetables after having left the washing and precooling parts of the apparatus. A frame 21 properly supports the parts of the apparatus.

From the description thus far given, the operation of our apparatus will be readily understood and is about as follows, assuming the celery is the vegetable to be prepared for packing:—

The bunches of celery are placed transversely on the conveyor 1 so that the portions of the tops to be removed will be carried in the path of the cutter 6 to be there removed, together with adhering soil. The precleaned bunches are then delivered on to conveyor 10 and now travel endwise against the sprays of water which are forcibly applied from above and below to thus thoroughly wash off all undesirable matter, insects and the like, so as to leave the bunches in condition fit for use or market.

The next stage is the precooling. This is accomplished as the celery passes through the precooler which is kept at lowered temperature by iced water. If desired, of course the cooling might be effected by properly chilled air similar to the cooled drying which takes place in the drying portion of the apparatus. As the celery passes through the drying station superfluous water is removed and the cleansed, cooled stalks or bunches are ready for shipping. Celery thus treated retains its texture and flavor far better and presents a far more attractive appearance than does celery treated by the old methods.

To properly protect the cleaned and crisp celery, we wrap each bunch in a covering of paper or the like and then pack them in crates for shipment.

From the foregoing, it will be seen that we provide an exceedingly simple and efficient apparatus and mode of operation for cleaning and precooling celery and other vegetables prior to shipment.

Having now described our invention, what we claim as new and useful, of our own invention, and desire to secure by Letters Patent, is:

1. That method of preparing vegetables, which comprises subjecting the vegetables to be prepared in a continuous path to a preliminary cleansing for the removal of superfluous vegetation and adhering foreign matter, then submitting said vegetables to impinging jets of wash-water applied in opposition to the path of travel of said succession of vegetables, then cooling said vegetables and removing excess of moisture.

2. That method of preparing and packing celery for shipment, which comprises subjecting individual celery bunches in succession to a trimming of loose leaves and fibrous roots, then moving said trimmed celery bunches through jets of wash-water impinged tangentially onto said succession of celery bunches traveling in opposition to said impinging wash-water, then submitting said trimmed and washed celery bunches to a sudden drop in temperature for cooling the same, and finally removing excess of moisture from said celery bunches for packing and shipping.

3. The method of treating celery, which comprises subjecting said celery to a cleaning action to remove excess vegetation and foreign matter, then causing said celery to travel against stream of flowing wash-water to thereby remove the last traces of earth and other foreign matter, then subjecting said clean celery to a cooling medium, and finally removing excess of moisture from said cleaned and cooled celery.

In testimony whereof we have hereunto set our hands on this 16th day of April, A. D. 1925.

JOHN W. BELL.
THOMAS J. BELL.